United States Patent Office 3,346,669
Patented Oct. 10, 1967

3,346,669
HALO-PHOSPHORUS COMPOUNDS AND
PROCESS FOR THEIR PREPARATION
Erik Regel, Mission, Kans., assignor to Chemagro Corporation, Kansas City, Mo., a corporation of New York
No Drawing. Filed Apr. 6, 1964, Ser. No. 357,761
18 Claims. (Cl. 260—960)

This invention relates to a novel class of chemical compositions characterized in that they are alpha-halo containing phosphonochloridothioates and phosphinothioates and to a method for producing said compounds.

To illustrate and characterize the chemical composition in a more precise manner the following formula is presented to define compounds within the scope of this invention $$\begin{array}{c}R_1 \quad O \quad SR_3 \\ \diagdown \quad \| \diagup \\ C{-}P \\ \diagup \quad | \quad \diagdown \\ R_2 \quad X \quad R_4\end{array}$$

where
$R_1$ is alkyl containing 1 to 8 carbon atoms
$R_2$ is alkyl containing 1 to 8 carbon atoms, the same or different from $R_1$, phenyl, halophenyl, or benzyl
$R_1$ and $R_2$ taken together is $-CH_2-CH_{2n}-CH_2$ and $n$ is a whole number from 1 to 3 inclusive
$R_3$ is alkyl containing 1 to 8 carbon atoms and haloalkyl containing 1 to 3 carbon atoms
$R_4$ is halogen, phenyl, halophenyl, benzyl or alkyl radicals containing 1 to 8 carbon atoms
X is halogen, preferably chlorine or bromine The compounds of this invention are prepared by reacting phosphorus trichloride or $R_4PCl_2$ where $R_4$ is as described above with a ketone of the formula $R_1R_2CO$ where $R_1$ and $R_2$ are as described above in the presence of a mercaptan $R_3SH$ where $R_3$ is as described above. These reactions are conveniently illustrated by the following equations:

$$PCl_3 + R_1R_2CO + R_3SH \longrightarrow \begin{array}{c}R_1 \quad O \quad SR_3 \\ \diagdown \quad \| \diagup \\ C{-}P \\ \diagup \quad | \quad \diagdown \\ R_2 \quad Cl \quad Cl\end{array} + HCl$$

$$R_4PCl_2 + R_1R_2CO + R_3SH \longrightarrow \begin{array}{c}R_1 \quad O \quad SR_3 \\ \diagdown \quad \| \diagup \\ C{-}P \\ \diagup \quad | \quad \diagdown \\ R_2 \quad Cl \quad R_4\end{array} + HCl$$

In place of $PCl_3$ there can be used $PBr_3$ and the corresponding bromine compounds can thus be prepared.

Attempts were made to replace the ketone with an aldehyde to form the compound

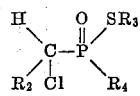

but in every case the reaction led to the formation of mercaptols and no material characterized by the above formula was recovered from the reaction.

Attempts to extend the scope of the reaction by substituting for $PCl_3$ or $R_4PCl_2$ a halophosphite represented by $ROPCl_2$ or $(RO)_2PCl$ where R represents lower alkyl did not result in phosphorylation of the ketone but led exclusively to reaction products of the mercaptan with the alkylhalophosphites.

When an alcohol, for example methyl alcohol or ethyl alcohol, was used in the reaction in place of a mercaptan no phosphorylation of the ketone occurred but dialkyl phosphite was formed. The ketone merely acted as an inert solvent with the reaction product formed being the same as if no ketone solvent had been employed. It is apparent that the ketone did not react under the reaction conditions employed.

When $PCl_3$, $PBr_3$ or $R_4PCl_2$ is added to a ketone, e.g. acetone, no noticeable reaction occurs such as color change, temperature rise or gas evolution. When 0.05 mole of $PCl_3$ was added to 0.05 mole of acetone at 20° C. no reaction appeared to take place. A portion of this mixture was subjected to infrared scan between 2 and 15 microns to determine if any new absorption peaks appeared or any peaks disappeared when compared to the spectrum of each compound scanned separately. No new peaks appeared nor did any peaks disappear when the spectrum of the mixture was compared to the spectrum of the individual compounds. Scans of the infrared spectrum of the mixture after standing for 6 hours were repeated and compared with the spectrum of freshly prepared mixture and no change occurred between the two samples. This indicates that no apparent reaction occurred between acetone and $PCl_3$ in one case, $PBr_3$ in another and $R_4PCl_2$ (where $R_4$ was phenyl) in another example.

Since, when 3 moles of an alcohol are added to a mixture of $PCl_3$ and acetone the well known phosphites are formed by this usual reaction, whether acetone is present or not as a solvent, it was unexpected to find when alcohol was replaced in the reaction with a mercaptan that the expected and known thiophosphites were not formed according to the reactions

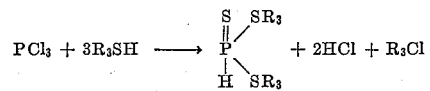

or

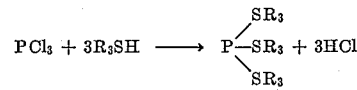

Instead, the product isolated in high yields (75–96%) is a phosphonate having the structure

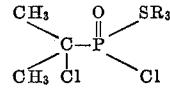

When an excess $R_3SH$ is used neither the chlorine atom on the phosphorus nor the chlorine atom on the tertiary carbon react to form disulfur containing phosphorus derivatives even at temperatures as high as 95° C. I have discovered, however, if I react a mixed aromatic-aliphatic ketone such as acetophenone or chloroacetophenone in place of an aliphatic ketone and conduct the reaction at an elevated temperature in the range of 70 to 130° C. a reaction occurs between the chlorine attached to the phosphorus atom and the mercaptan to produce a dithio phosphonate

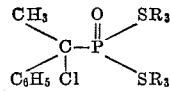

Both aliphatic and aliphatic-aromatic ketones lead only to monothio-substitution with mercaptans when the reaction is conducted at temperatures between —20 to +40° C.

What I have discovered is that a mercaptan induces a reaction between $PCl_3$ or $PBr_3$ or $R_4PCl_2$ and aliphatic or aliphatic-aromatic ketones resulting in the formation of compounds not heretofore described.

The following examples are illustrative of this invention:

*Example 1.—S-ethyl-α-chloro-α-methyl propylphosphonochloridothioate*

Butanone (1 mole) and phosphorus trichloride (1 mole) were mixed at 0° C. and ethylmercaptan was added dropwise while the mixture was kept below 10° C. by cooling and agitation. Hydrogen chloride was liberated and reaction mixture became yellow. After the addition of ethylmercaptan was completed the mixture was allowed to warm up to 25° C. and agitation was continued until hydrogen chloride evolution ceased. Carbon tetrachloride (200 ml.) was added and the resulting solution was washed with water until the solution was almost neutral (pH 6). The carbon tetrachloride solution was dried over anhydrous sodium sulfate, filtered and the solvent was distilled off in vacuum. The remaining yellow oil (84% of theory) can be distilled, yielding the pure S-ethyl-α-chloro-α-methyl propylphosphonochloridothioate in 76% of theory, B.P. $_{0.15}$ 80° C. $n_D^{25}$ 1.5186. Molecular weight: 235.2 Calculated: Cl, 30.2%; P, 13.2%; S, 13.7%. Found: Cl, 29.7%; P, 13.2%; S, 14.0%.

*Example 2.—S,S-dibutyl-α-chloro-α-phenyl ethylphosphonodithioate*

Acetophenone (0.2 mole) and phosphorus trichloride (0.2 mole) were mixed at room tempertaure and agitated for 1 hour. A slightly exothermic reaction occurred and the mixture became pale green.

Butylmercaptan (0.4 mole) was added dropwise at 20° to the cooled and well agitated mixture. Reaction mixture was kept at 20° for 1 hour until hydrogen chloride evolution ceased and was then heated for 1 hour at 90° until no more hydrogen chloride was liberated. The cooled mixture was diluted with 100 ml. carbon tetrachloride and washed with water until almost neutral. After drying the solution over anhydrous sodium sulfate and evaporation of the solvent, the low boiling components of the crude mixture were removed in vacuum of 0.04 mm. Hg at 90°. The crude S,S-dibutyl-α-chloro-α-phenyl ethylphosphonodithioate was obtained as a yellow oil ($n_D^{20}$ 1.5732) in 84% yield. Molecular weight: 364.5. Calculated: P, 8.6%; S, 17.6%. Found: P, 7.7%; S, 17.9%.

*Example 3.—S-methyl-α-chloroisopropyl phenylphosphinothioate*

Phenyldichlorophospine (1 mole) and acetone (1 mole) were mixed at 10° C. and methylmercaptan (1 mole) was introduced within 3 to 4 hours. During this time the mixture was well agitated. The reaction mixture was then poured into ice water and the crude product was taken up in benzene, washed with water until almost neutral, dried over anhydrous sodium sulfate and filtered. The solvent was removed under vacuum. The remainder crystallized after several hours. When recrystallized from ethyl alcohol, the pure S-methyl-α-chloroisopropyl phenyl phosphinothioate was obtained as a white solid, m. 100°. Molecular weight: 248.7. Calculated: Cl, 14.3%; P, 12.5%; S, 12.9%. Found: Cl, 14.0%; P, 12.3%; S, 12.8%.

Representative ketones which may be employed in this invention are dimethyl ketone, methyl ethyl ketone, diethyl ketone, methyl propyl ketone, methyl isopropyl ketone, ethyl butyl ketone, dipropyl ketone, methyl t-butyl ketone, isobutyl hexyl ketone, ethyl octyl ketone, acetophenone, phenyl acetone, p-chloroacetophenone.

Representative mercaptans which may be employed in this invention are methyl mercaptan, ethyl mercaptan, propyl mercaptan, isopropyl mercaptan, butyl mercaptan, sec-butyl mercaptan, t-butyl mercaptan, amyl mercaptan, hexyl mercaptan, octyl mercaptan, 2-ethyl hexyl mercaptan, chloromethyl mercaptan, chloroethyl mercaptan, dichloroethyl mercaptan, trichloroethyl mercaptan, and chloropropyl mercaptan.

Examples of compounds of this invention prepared from the starting materials described above are listed in the Table 1. There is also listed the boiling and refractive indices where available.

TABLE 1

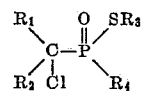

| Compound No. | $R_1$ | $R_2$ | $R_3$ | $R_4$ | Boiling Point, °C./mm. Hg | Refractive Index |
|---|---|---|---|---|---|---|
| 1 | Me | Me | Me | Cl | (48) 63/0.01 | 1.5270$^{28}$ |
| 2 | Me | Me | Et | Cl | 55–60/0.005 | 1.5166$^{28}$ |
| 3 | Me | Me | iso-Pr | Cl | 70/0.02 | 1.5055$^{30}$ |
| 4 | Me | Me | Bu | Cl | 80–85/0.04 | 1.5085$^{25}$ |
| 5 | Me | Me | sec-Bu | Cl | 75/0.02 | 1.5058$^{30}$ |
| 6 | Me | Me | iso-Bu | Cl | 75/0.04 | 1.5052$^{30}$ |
| 7 | Me | Et | Me | Cl | 75/0.15 | 1.5265$^{28}$ |
| 8 | Me | Et | Bu | Cl | 100/0.1 | 1.5095$^{25}$ |
| 9 | Me | Et | Et | Cl | 80/0.15 | 1.5186$^{25}$ |
| 10 | Me | Pr | Me | Cl | 94–98/0.02 | 1.5200$^{26}$ |
| 11 | Me | Am | Et | Cl | 113/0.1 | 1.5030$^{28}$ |
| 12 | Et | Bu | Et | Cl | 100/0.2 | 1.5097$^{29}$ |
| 13 | Pr | Pr | Et | Cl |  | 1.5070$^{28}$ |
| 14 | Me | Hex | Et | Cl |  | 1.5010$^{28}$ |
| 16 | —(CH$_2$)$_4$— |  | Me | Cl | 89/0.10 | 1.5450$^{26}$ |
| 17 | —(CH$_2$)$_4$— |  | Bu | Cl | 118/0.15 | 1.5232$^{28}$ |
| 18 | —(CH$_2$)$_5$— |  | Bu | Cl | 130/0.1 | 1.5261$^{25}$ |
| 19 | Me | PhCH$_2$ | Me | Cl |  | 1.5736$^{20}$ |
| 20 | Me | PhCH$_2$ | Bu | Cl |  | 1.5550$^{25}$ |
| 21 | Me | Ph | Me | Cl |  | 1.5550$^{28}$ |
| 22 | Me | Ph | Bu | Cl |  | 1.5691$^{20}$ |
| 23 | Me | p-ClPh | Bu | Cl |  | 1.5840$^{27}$ |
| 27 | Me | Me | Me | Ph | 100 (EtOH) |  |
| 28 | Me | Me | Bu | Ph | 158/0.1 | 1.5544$^{28}$ |
| 25 | Me | Me | Me | Me | 61/0.13 | 1.5271$^{26}$ |
| 26 | Me | Me | Me | Pr | 85/0.3 | 1.5153$^{26}$ |
| 29 | Me | Me | Cl(CH$_2$)$_3$— | Cl | 100/0.03 | 1.5320$^{20}$ |
| 30 | Me | Me | Pinanyl | Cl | 135/0.2 | 1.5326$^{20}$ |
| 31 | Me | Et | Cl(CH$_2$)$_3$— | Cl | 125/0.04 | 1.5306$^{20}$ |
| 32 | Me | iso-Bu | Me | Cl | 82/0.1 | 1.5163$^{20}$ |
| 33 | Me | iso-Bu | Et | Cl | 88/0.12 | 1.5085$^{20}$ |
| 34 | Et | Et | Me | Cl | 94/0.15 | 1.5300$^{20}$ |
| 35 | Et | Et | Et | Cl | 93/0.3 | 1.5229$^{20}$ |
| 36 | —(CH$_2$)$_4$— |  | Et | Cl | 82/0.06 | 1.5353$^{26}$ |
| 37 | —(CH$_2$)$_4$— |  | Pr | Cl | 90/0.03 | 1.5285$^{28}$ |
| 39 | iso-Bu | iso-Bu | Et | Cl | 110/0.2 | 1.5375$^{30}$ |
| 40 | —(CH$_2$)$_5$— |  | Et | Cl | 110/0.2 | 1.5375$^{30}$ |

When $PBr_3$ is used in place of $PCl_3$ examples of compounds prepared are shown in Table 2.

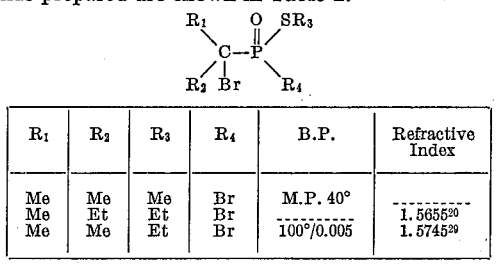

| $R_1$ | $R_2$ | $R_3$ | $R_4$ | B.P. | Refractive Index |
|---|---|---|---|---|---|
| Me | Me | Me | Br | M.P. 40° | |
| Me | Et | Et | Br | | 1.5655²⁰ |
| Me | Me | Et | Br | 100°/0.005 | 1.5745²⁹ |

*Example 4.—Herbicidal activity*

Tests for herbicidal activity were carried out in the following manner. Oats, sugar beets, radish, flax, and wheat seeds were planted in soil contained in flats measuring 14″ x 10″ x 3½″. Ten to 14 days after planting and the plants had emerged from the soil formulations and dilutions of the test chemicals were made and applied to the plants growing in the flats at rates of 20 and 5 pounds per acre.

Formulations consisted of preparing a 2 pound per gallon test chemical in a pre-mix with the following composition. Parts expressed are by volume.

8 parts of a mixture of mono-di- and tri-methyl-naphthalenes (Velsicol AR 50 G)
1 part butyl carbitol acetate
1 part Triton X 161 (mixture of p-octyl-phenol-ethylene oxide adduct containing about 16 ethylene oxide units together with a sodium alkylphenyl sulfonate).

Appropriate dilutions in water of the formulated material were applied to the plants growing in the flats. After 5 days observations and records were made of the effect of the test chemical on the 5 planted crops.

Readings were based on a 0 to 10 scale, where 0 indicates no damage or effect and 10 indicates a complete kill of the plant.

TABLE 3

| Compound No. | Lbs./A | Flax | Sugar Beets | Radish | Wheat | Oats |
|---|---|---|---|---|---|---|
| 1 | 20 | 9 | 9 | 9 | 6 | 8 |
|   | 5  | 5 | 5 | 3 | 3 | 2 |
| 2 | 20 |   |   |   |   |   |
|   | 5  | 3 | 5 | 1 | 0 | 2 |
| 3 | 20 | 10 | 10 | 10 | 7 | 6 |
|   | 5  | 3 | 10 | 7 | 7 | 7 |
| 4 | 20 |   | 3 |   |   | 0 |
|   | 5  |   | 0 |   |   | 0 |
| 5 | 20 | 7 | 8 | 8 | 0 | 2 |
|   | 5  | 0 | 0 | 0 | 0 | 0 |
| 6 | 20 | 2 | 3 | 2 | 0 | 0 |
|   | 5  | 0 | 0 | 0 | 0 | 0 |
| 7 | 20 | 9 | 9 | 9 | 9 | 10 |
|   | 5  | 3 | 7 | 6 | 6 | 4 |
| 8 | 20 | 9 | 10 | 10 | 8 | 9 |
|   | 5  | 3 | 5 | 3 | 2 | 1 |
| 9 | 20 | 6 | 7 | 7 | 7 | 7 |
|   | 5  | 0 | 0 | 0 | 0 | 0 |
| 10 | 20 | 8 | 10 | 6 | 0 | 6 |
|    | 5  | 2 | 2 | 2 | 0 | 0 |
| 11 | 20 |   |   |   |   |   |
|    | 5  | 7 | 9 | 3 | 7 | 3 |
| 12 | 20 | 9 | 9 | 10 | 8 | 10 |
|    | 5  | 7 | 7 | 5 | 7 | 3 |
| 13 | 20 | 10 | 9 | 8 | 8 | 8 |
|    | 5  | 8 | 9 | 3 | 6 | 2 |
| 14 | 20 | 10 | 9 | 7 | 8 | 8 |
|    | 5  | 5 | 8 | 3 | 4 | 3 |
| 15 | 20 | 7 | 10 | 7 | 4 | 7 |
|    | 5  | 0 | 3 | 1 | 0 | 1 |
| 16 | 20 | 10 | 10 | 10 | 9 | 10 |
|    | 5  | 10 | 10 | 10 | 8 | 9 |
| 17 | 20 | 9 | 9 | 10 | 7 | 8 |
|    | 5  | 7 | 9 | 8 | 7 | 7 |
| 18 | 20 | 6 | 9 | 8 | 10 | 10 |
|    | 5  | 0 | 0 | 0 | 0 | 0 |
| 19 | 20 | 10 | 10 | 10 | 9 | 9 |
|    | 5  | 8 | 9 | 9 | 8 | 9 |
| 20 | 20 | 10 | 8 | 7 | 9 | 7 |
|    | 5  | 5 | 5 | 3 | 0 | 0 |
| 21 | 20 | 9 | 10 | 10 | 9 | 10 |
|    | 5  | 9 | 9 | 9 | 8 | 8 |
| 22 | 20 | 6 | 9 | 8 | 9 | 9 |
|    | 5  | 0 | 0 | 0 | 9 | 9 |
| 23 | 20 | 7 | 10 | 6 | 4 | 6 |
|    | 5  | 3 | 7 | 3 | 6 | 2 |
| 24 | 20 |   |   |   |   |   |
|    | 5  |   |   |   |   |   |

POST-EMERGENCE HERBICIDAL ACTIVITY OF α-CHLOROALKYLPHOSPHINOTHIOATES

| Compound No. | Lbs./A | Flax | Sugar Beets | Radish | Wheat | Oats |
|---|---|---|---|---|---|---|
| 25 | 20 | 9 | 9 | 9 | 8 | 8 |
|    | 5  | 7 | 9 | 8 | 7 | 6 |
| 26 | 20 | 9 | 10 | 10 | 8 | 9 |
|    | 5  | 8 | 9 | 9 | 6 | 9 |
| 27 | 20 | 7 | 9 | 6 | 1 | 0 |
|    | 5  | 0 | 1 | 0 | 0 | 1 |
| 28 | 20 | 5 | 7 | 8 | 7 | 7 |
|    | 5  | 5 | 7 | 3 | 0 | 0 |

The alpha-halo containing phosphonochloridothioates in addition to herbicidal activity are useful as intermediates for preparing other new compounds. For example, they may be reacted with alcohols according to the following equation:

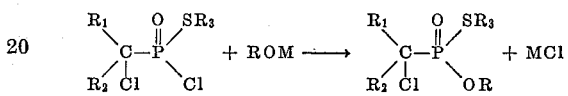

ROM represents an alkali metal salt of an alcohol such as methyl alcohol, ethyl alcohol, propyl alcohol, isopropyl alcohol, phenol and the like. In the presence of molar quantities of the alcoholate the reaction proceeds preferentially and only with the chlorine on the phosphorus atom. If 2 moles of the sodium salt of the alcohol is employed the chlorine on the carbon atom is not replaced by an alcohol group. In contradistinction to reactions of the alcoholates with alpha-halo containing phosphonochloridothioates metal mercaptides such as sodium mercaptides in molar excess react according to the following equation:

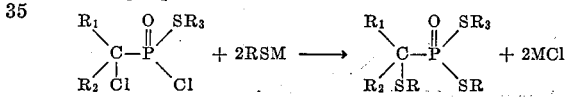

where M is an alkali metal such as sodium, potassium and the like. Suitable mercaptans are methyl, ethyl, butyl, sec-butyl, amyl, octyl, and isooctyl. The alpha-halo containing phosphinothioates are also useful as intermediates for preparing new compounds. For example they may be reacted with metal mercaptides according to the following equation:

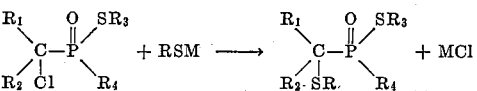

While the invention has been described with particular reference to specific embodiments, it is to be understood that it is not to be limited thereto, but it is to be construed broadly and restricted solely by the scope of the appended claims.

I claim:
1. A compound of the formula

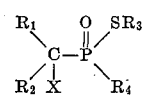

where
$R_1$ is an alkyl radical having 1 to 8 carbon atoms
$R_2$ is a hydrocarbon radical selected from the group consisting of alkyl having 1 to 8 carbon atoms, phenyl, chlorophenyl, and benzyl
$R_1$ and $R_2$ taken together is $-CH_2-CH_{2n}-CH_2-$ and $n$ is a whole number from 1 to 3 inclusive
$R_3$ is a hydrocarbon radical selected from the group consisting of alkyl having 1 to 8 carbon atoms and haloalkyl containing 1 to 3 carbon atoms inclusive
$R_4$ is a member of the group consisting of chlorine or bromine and a hydrocarbon radical selected from the group consisting of phenyl, benzyl, and alkyl having 1 to 8 carbon atoms X is a halogen selected from the class consisting of chlorine and bromine.

2. A compound of the formula

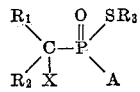

where
R$_1$ is alkyl having 1 to 8 carbon atoms
R$_2$ is alkyl having 1 to 8 carbon atoms
R$_1$ and R$_2$ taken together is —CH$_2$—CH$_{2_n}$—CH$_2$— and $n$ is a whole number from 1 to 3 inclusive
R$_3$ is alkyl having 1 to 8 carbon atoms
A is halogen selected from the class consisting of chlorine and bromine
X is a halogen selected from the class consisting of chlorine and bromine.

3. A compound of the formula

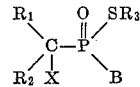

where
R$_1$ is alkyl having 1 to 8 carbon atoms
R$_2$ is alkyl having 1 to 8 carbon atoms
R$_1$ and R$_2$ taken together is —CH$_2$—CH$_{2_n}$—CH$_2$— and $n$ is a whole number from 1 to 3 inclusive
R$_3$ is alkyl having 1 to 8 carbon atoms
B is phenyl
X is a halogen selected from the class consisting of chlorine and bromine 4. A compound having the formula

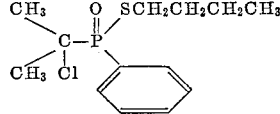

5. A compound having the formula

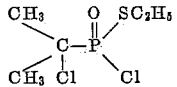

6. A compound having the formula

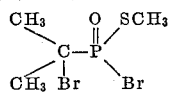

7. A compound having the formula

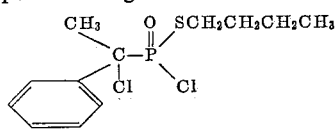

8. A compound having the formula

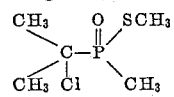

9. A compound having the formula

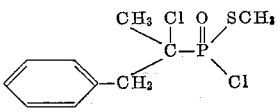

10. A compound having the formula

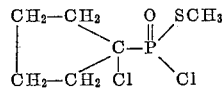

11. A process of preparing alpha-halo thiophosphorus containing compounds which comprises reacting essentially one mole of an alkyl mercaptan having 1 to 8 carbon atoms and essentially one mole of a ketone having the formula

where
R$_1$ is an alkyl radical having 1 to 8 carbon atoms and
R$_2$ is a hydrocarbon radical selected from the group consisting of alkyl having 1 to 8 carbon atoms, phenyl, chlorophenyl, and benzyl
R$_1$ and R$_2$ taken together is —CH$_2$—CH$_{2_n}$—CH$_2$— and $n$ is a whole number from 1 to 3 inclusive
with essentially one mole of halophosphine selected from the group consisting of PX$_3$ and R$_4$PX$_2$ where
R$_4$ is a hydrocarbon radical selected from the group consisting of alkyl having 1 to 8 carbon atoms, phenyl, and benzyl and
X is chlorine or bromine.

12. A process according to claim 11 where R$_1$ and R$_2$ are independently alkyl radicals having 1 to 8 carbon atoms and R$_4$ is an alkyl radical having 1 to 8 carbon atoms.

13. A process according to claim 11 where R$_1$ and R$_2$ are independently alkyl radicals having 1 to 8 carbon atoms and R$_4$ is phenyl.

14. A process according to claim 12 where X is chlorine.

15. A process according to claim 13 where X is chlorine.

16. A process of preparing the compound of claim 5 which comprises reacting essentially one mole of acetone and essentially one mole of phosphorus trichloride with essentially one mole of ethyl mercaptan.

17. A process of preparing the compound of claim 7 which comprises reacting essentially one mole of acetophenone and essentially one mole of phosphorus trichloride with essentially one mole of butyl mercaptan.

18. A process of preparing the compound of claim 6 which comprises reacting essentially one mole of acetone and essentially one mole of phosphorus tribromide with essentially one mole of methyl mercaptan.

No references cited.

CHARLES B. PARKER, *Primary Examiner.*
A. SUTTO, *Assistant Examiner.*